(12) United States Patent
Daykin

(10) Patent No.: US 9,664,195 B2
(45) Date of Patent: May 30, 2017

(54) VACUUM PUMPING SYSTEM

(75) Inventor: Austin Jonathan Daykin, Bristol (GB)

(73) Assignee: Edwards Limited, Burgess Hill, West Sussex (GB)

( * ) Notice: Subject to any disclaimer, the term of this patent is extended or adjusted under 35 U.S.C. 154(b) by 427 days.

(21) Appl. No.: 14/004,337

(22) PCT Filed: Mar. 28, 2012

(86) PCT No.: PCT/GB2012/050686
§ 371 (c)(1),
(2), (4) Date: Sep. 10, 2013

(87) PCT Pub. No.: WO2012/140406
PCT Pub. Date: Oct. 18, 2012

(65) Prior Publication Data
US 2013/0340842 A1    Dec. 26, 2013

(30) Foreign Application Priority Data
Apr. 14, 2011  (GB) .................................. 1106310.4

(51) Int. Cl.
*F04D 19/04*    (2006.01)
*B01D 45/02*    (2006.01)
(Continued)

(52) U.S. Cl.
CPC ........... *F04D 19/042* (2013.01); *B01D 45/02* (2013.01); *F04B 37/08* (2013.01); *F04B 37/085* (2013.01);
(Continued)

(58) Field of Classification Search
CPC ...... F04C 25/02; F04C 28/02; F04C 2220/30; F04D 19/046; F04D 17/168;
(Continued)

(56) References Cited

U.S. PATENT DOCUMENTS

| 4,332,522 A | 6/1982 | Saulgeot |
| 4,371,563 A * | 2/1983 | Muehlberger ....... B01D 47/024 219/121.47 |
| 6,158,226 A * | 12/2000 | Noji ..................... B01D 53/002 62/3.4 |
| 2002/0139249 A1* | 10/2002 | Livingston ............. B01D 45/14 95/270 |

(Continued)

FOREIGN PATENT DOCUMENTS

| CN | 101839234 A | 9/2010 |
| DE | 102008009715 A1 | 8/2009 |

(Continued)

OTHER PUBLICATIONS

International Search Report dated Jul. 9, 2012 for corresponding International Application No. PCT/GB2012/050686, filed Mar. 28, 2012.

(Continued)

*Primary Examiner* — Atif Chaudry
(74) *Attorney, Agent, or Firm* — Shaoni L. Mitchell

(57) ABSTRACT

To overcome the problem associated with liquid or solid process debris from a vacuum process system falling into, and contaminating or damaging, a vacuum pumping arrangement used to evacuate the system, the inlet of the vacuum pumping arrangement is located lower than the outlet of the arrangement. This provides a net flow of gas pumped by the arrangement in a generally upwards direction thereby resisting the passage of contaminants into the arrangement.

8 Claims, 4 Drawing Sheets

(51) Int. Cl.
    *F04C 28/02* (2006.01)
    *F04D 17/16* (2006.01)
    *F04B 41/06* (2006.01)
    *F04B 53/00* (2006.01)
    *F04B 37/14* (2006.01)
    *F04B 37/08* (2006.01)
    *F04C 25/02* (2006.01)
    *F04C 23/00* (2006.01)

(52) U.S. Cl.
    CPC ............. *F04B 37/14* (2013.01); *F04B 41/06* (2013.01); *F04B 53/00* (2013.01); *F04C 23/001* (2013.01); *F04C 25/02* (2013.01); *F04C 28/02* (2013.01); *F04D 17/168* (2013.01); *F04D 19/046* (2013.01); *F04C 2220/30* (2013.01); *F04C 2280/02* (2013.01); *Y10T 137/0402* (2015.04); *Y10T 137/86083* (2015.04); *Y10T 137/86139* (2015.04)

(58) Field of Classification Search
    CPC ........ F04D 19/042; F04B 37/14; F04B 41/06; B01D 45/02; Y10T 137/86083; Y10T 137/86139
    See application file for complete search history.

(56) References Cited

U.S. PATENT DOCUMENTS

2010/0115971 A1  5/2010  Tsuyuki
2010/0178185 A1  7/2010  Leu et al.

FOREIGN PATENT DOCUMENTS

| DE | 102008061805 A1 | 6/2010 |
| EP | 0344345 A1 | 12/1989 |
| EP | 2175139 A2 | 4/2010 |
| JP | 2009091919 A | 4/2009 |
| WO | 2006000745 A1 | 1/2006 |
| WO | 2008032108 A1 | 3/2008 |
| WO | 2008036849 A2 | 3/2008 |

OTHER PUBLICATIONS

International Written Opinion of the International Searching Authority dated Jul. 9, 2012 for corresponding International Application No. PCT/GB2012/050686, filed Mar. 28, 2012.
United Kingdom Search Report dated Aug. 6, 2011 of Application No. GB1106310.4, filed Apr. 14, 2011.

* cited by examiner

VACUUM PUMPING SYSTEM

CROSS-REFERENCE TO RELATED APPLICATION

This Application is a Section 371 National Stage Application of International Application No. PCT/GB2012/050686, filed Mar. 28, 2012, which is incorporated by reference in its entirety and published as WO2012/140406 A1 on Oct. 18, 2012 and which claims priority to British Patent Application No. 1106310.4 filed Apr. 14, 2011.

BACKGROUND

The present disclosure relates to a vacuum pumping system comprising a vacuum pumping arrangement.

FIG. 4 shows a vacuum pumping system 100 comprising a vacuum pumping arrangement 102 for evacuating gas from a vacuum processing chamber 104, such as that of a solar panel, flat panel, LED or semi-conductor processing tool. The vacuum pumping arrangement comprises a primary pump 106 and a secondary pump 108 arranged in series. The primary, or roughing, pump 106 exhausts at atmosphere and may be a dry pump such as a screw, roots, claw or scroll pump. The secondary, or high vacuum, pump 108 is connected to the vacuum chamber 104 and exhausts to the inlet of the primary pump. The secondary pump is typically a turbo-molecular pump or mechanical booster pump.

The vacuum pumping system 100 comprises a foreline vacuum line 110, which can be any suitable conduit such as a pipe or hose, connecting the vacuum chamber 102 to the vacuum pumping arrangement 104 and the inlet of the secondary pump 108. A further foreline conduit 112 connects the exhaust of the secondary pump 108 to the inlet of the primary pump 106. An exhaust line conduit 114 connects to the exhaust of the primary pump 106.

The vacuum pumping system may further comprise an abatement apparatus 116 for removing noxious substances from the gas evacuated from the vacuum chamber 104. A valve 118, such as a bypass valve, diverts gas to a gas storage facility 120 during abatement apparatus downtime. The exhaust line conduit 114 is connected to the valve 118 for ducting gas to either the abatement apparatus 116 or the storage facility 120.

Gas exhausted from the process chamber 104 typically contains contaminants in addition to process gases. The contaminants may comprise particulates, such as silica dust; or liquid precursors, such as TEOS. In the vacuum pumping system shown in FIG. 4, the vacuum processing chamber 104 is located above the vacuum pumping arrangement 102 and the vacuum line 110 ducts gas in a generally downwards direction to the inlet of the vacuum pumping arrangement and through the arrangement to the exhaust line. Contaminants present in the gas stream drop under gravity into the vacuum pumping arrangement causing damage or reduced operability. A trap may be provided in the vacuum line 110 between the vacuum chamber and the pumping arrangement assisting in the collection and protection of the vacuum pumping arrangement, but are generally located high above the vacuum pump and are ergonomically difficult to service.

The exhaust of the vacuum pumping arrangement is at or proximate floor level. The inlet of the abatement apparatus is generally located in an elevated position, relative to the exhaust of the pumping arrangement, and accordingly the exhaust line 114 is often of considerable length. The extended length of the exhaust line may comprise such disadvantageous features as U-bends and horizontal pipework that can provide an abundance of locations for process by-products to deposit. In order to prevent condensation of exhausted substances it is generally required that valve 118 is heated, as shown, which contributes to the cost of ownership of the vacuum pumping system.

It is an object of the invention to provide an improved vacuum pumping system.

The discussion above is merely provided for general background information and is not intended to be used as an aid in determining the scope of the claimed subject matter. The claimed subject matter is not limited to implementations that solve any or all disadvantages noted in the background.

SUMMARY

A vacuum pumping system for evacuating a vacuum chamber, the system comprising a vacuum pumping arrangement for pumping gas from inlet to an outlet thereof, the inlet being located in use lower than the outlet and the net flow of gas pumped by the arrangement is in a generally upwards direction thereby resisting the passage of contaminants into the arrangement.

Other preferred and/or optional aspects are defined in the accompanying claims.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order that the present invention may be well understood, an embodiment thereof, which is given by way of example only, will now be described with reference to the accompanying drawings, in which.

DETAILED DESCRIPTION

Figure 1:
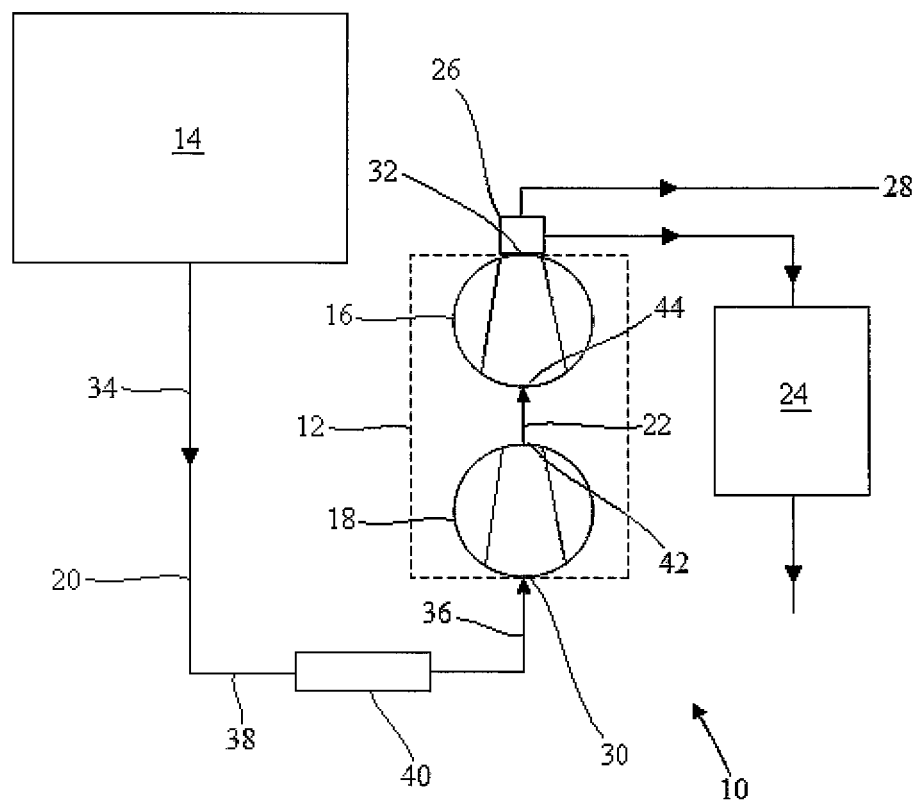
FIG. 1 shows schematically a vacuum pumping system.

A vacuum pumping system 10 is shown in FIG. 1. The system 10 comprises a vacuum pumping arrangement 12 for evacuating gas from a vacuum chamber 14, such as processing chamber of a semi-conductor processing tool. The vacuum pumping arrangement comprises a primary pump 16 and a secondary pump 18 arranged in series. The primary, or roughing, pump 16 exhausts at atmosphere and may be a dry pump such as a scroll, screw, roots or claw pump. The secondary, or high vacuum, pump 18 is connected to the vacuum chamber 14 and exhausts to the inlet of the primary pump. The secondary pump is typically a turbo-molecular or mechanical booster pump.

The vacuum pumping system 10 comprises a foreline vacuum line 20, which can be any suitable conduit such as a pipe or hose, connecting the vacuum chamber 14 to the vacuum pumping arrangement 12 and the inlet of the secondary pump 18. A further conduit 22 connects the exhaust of the secondary pump 18 to the inlet of the primary pump 16.

The vacuum pumping system may further comprise an abatement apparatus 24 for removing noxious substances from the gas evacuated from the vacuum chamber 14. A valve 26, such as a bypass valve, diverts gas to a gas storage facility 28 during abatement apparatus downtime.

Figure 4:
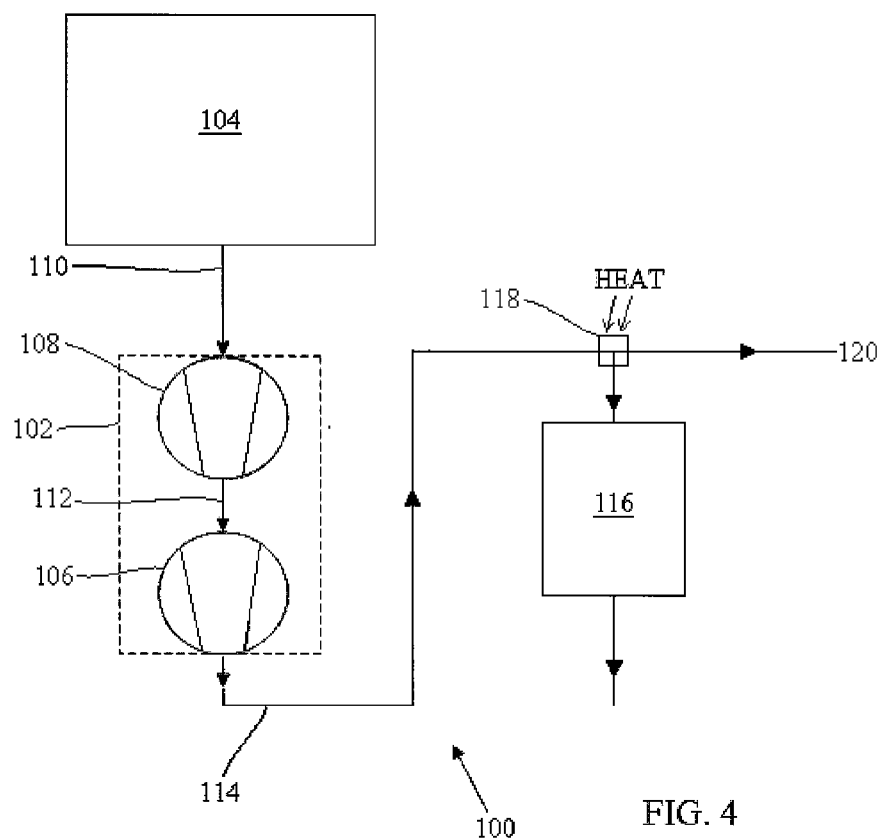
FIG. 4 shows schematically a prior art vacuum pumping system.

Gas exhausted from the process chamber 14 typically contains contaminants in addition to process gases. The contaminants may comprise particulates, such as silica; and/or liquid precursors, such as TEOS; or even cleaning materials. In the vacuum pumping system shown in FIG. 4, the vacuum chamber 104 is located above the vacuum pumping arrangement 102 and the duct 110 ducts gas in a generally downwards direction to the inlet of the vacuum pumping arrangement and through the arrangement to the exhaust line. A problem with this arrangement as discussed above is that contaminants tend to collect in the vacuum pumping arrangement causing damage or loss of efficiency.

In the present system as shown in FIG. 1, the vacuum pumping arrangement 12, or at least the secondary pump 18, pumps gas in a generally upwards direction. In the present example the secondary 18 and primary 16 pumps both pump gas in a generally upwards direction. Accordingly, contaminants do not typically enter the pumping arrangement as to do so they would be required to move against the force of gravity.

The inlet 30 to the vacuum pumping arrangement 12 is below the outlet 32 from the arrangement. In the example shown, the inlet is located directly beneath the outlet but it will be appreciated that provided the inlet is below the outlet with respect to gravity any contaminants in the vacuum pumping arrangement will tend towards the inlet 30. The location of the inlet 30 towards a lower part of the vacuum pumping arrangement as shown means that flow along vacuum line 36 into the vacuum pumping arrangement is an in upwards direction thereby resisting the passage of contaminants into the arrangement.

It is preferred in the present system that both the primary and secondary pumps pump in an upwards directions and that respective inlets are lower than respective outlets from the pumps. However, if the most upstream pump pumps in an upwardly direction then depending on requirements such a system may be sufficient to resist the passage of contaminants into both pumps.

The vacuum line 20 is connected to the vacuum chamber and extends downwardly along section 34 to a location which is lower than the vacuum pumping arrangement 12. The vacuum line 20 extends in a generally upwards direction along section 36 to the vacuum pumping arrangement 12. Sections 34 and 36 are connected by a generally horizontal section 38. This configuration of pipes provides a section 36 which is connected to the vacuum pumping arrangement 12 from beneath. That is, the section 36 of the vacuum line which is connected to the inlet extends in a generally upwards direction to the inlet so that the gravitational force on the contaminants is greater than the force on the contaminants exerted by the gas flow in an upwardly direction due to the pumping arrangement. Accordingly, contaminants are urged away from, and therefore prevented from reaching, the inlet 30. Moreover, contaminants tend to be collected in the horizontal section 38 of the pipework and so do not tend to enter the vacuum pumping arrangement 12.

Additionally, a trap 40 may be provided as shown, such as a filter, or cyclone, for trapping contaminants in the flow along the vacuum line 20. The trap can be located at a relatively low access, near to or at floor level, allowing easy access for maintenance or replacement. This configuration constitutes an advantage over the prior art system in which a trap is located high above floor level and is therefore difficult to access and maintain.

In the example shown, the inlet 30 of the vacuum pumping arrangement 12 also constitutes the inlet of the secondary pump 18. The outlet 42 of the secondary pump 18 is located generally above the inlet 30 so that gas is pumped through the pump in a generally upwards direction. The inlet 44 of the primary pump 16 is located above the outlet 42 of the secondary pump and the further foreline conduit 22 connects the inlet 44 and outlet 42 directing gas in a generally upwards direction. The outlet 32 of the vacuum pumping arrangement 12 constitutes an outlet from the primary pump 16. The outlet 32 is generally above the inlet 44 so that gas is pumped through the primary pump 16 in a generally upwards direction.

In the prior art system 100, an exhaust line 114 extends from the outlet of the vacuum pumping arrangement 102 to a valve 118. The valve 118 requires a source of heat external to the vacuum pumping system to reduce condensation of substances in the valve. In the present vacuum pumping system 10, the valve 26 is conveniently located on or closely adjacent the housing of the primary pump 16 such that it receives heat from the primary pump during use. Accordingly, the valve 26 does not require a source of heat external to the system and instead receives heat energy generated by an existing component of the system. This system allows a reduction in the cost and energy of running the system. The valve 26 may be formed integrally with pump 16 or may be connected to pump 16 by a short length of exhaust line.

The valve 26 which may be a by-pass valve connects the primary pump selectively to the abatement apparatus 24 or a customer storage facility 28.

Existing vacuum pumping systems may comprise vacuum pumps having cartridge type vacuum pumping components such that the cartridge or cartridges can be removed, maintained and replaced. Such a cartridge type pump permits convenient retro-fitting of the system described with reference to FIG. 1 on site to existing vacuum pumping systems. A cartridge type pump is shown in FIGS. 2 and 3.

Figure 2:
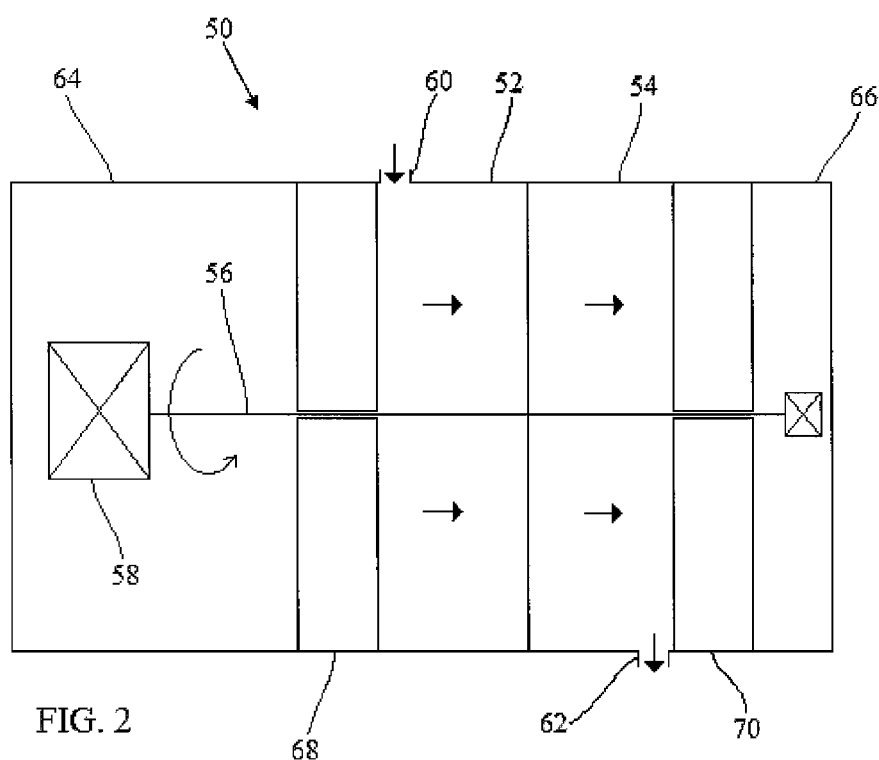
FIGS. 2 and 3 show an example of a vacuum pump of the vacuum pumping arrangement of the system shown in FIG. 1.

Referring to FIG. 2, pump 50 comprises a cartridge type vacuum pumping mechanism comprising two cartridges 52, 54. The vacuum pumping mechanism is connected to a drive shaft 56 which is driven by a motor 58 in a first direction of rotation for pumping gas from an inlet 60 to an outlet 62. The pump comprises motor and gear box (not shown) housing 64 and end plate 66 together with end plates 68, 70. In use, gas is pumped as shown by the arrows from inlet 60 at the top of the pump towards the right of the Figure and exhausted through the outlet 62 at the bottom of the pump.

A method of retro-fitting a vacuum pumping arrangement will now be described. The cartridges 52, 54 are removed, rotated through 180° and replaced as shown in FIG. 3. Components 64, 66, 68, 70 are maintained in the same position in FIGS. 2 and 3. As can be seen in FIG. 3, replacement of the cartridges relocates the inlet 60 and outlet 62 so that the inlet is at the bottom of the pump, the outlet 62 is at the top of the pump and gas is pumped in a generally upwards direction from the inlet to the outlet. Since the cartridges have been replaced in a rotated position, the motor is driven in an opposing, second, rotational direction to obtain the correct gas flow direction. It will be apparent to those skilled in the art that further minor modifications are required to the existing pump assembly.

Figure 3:
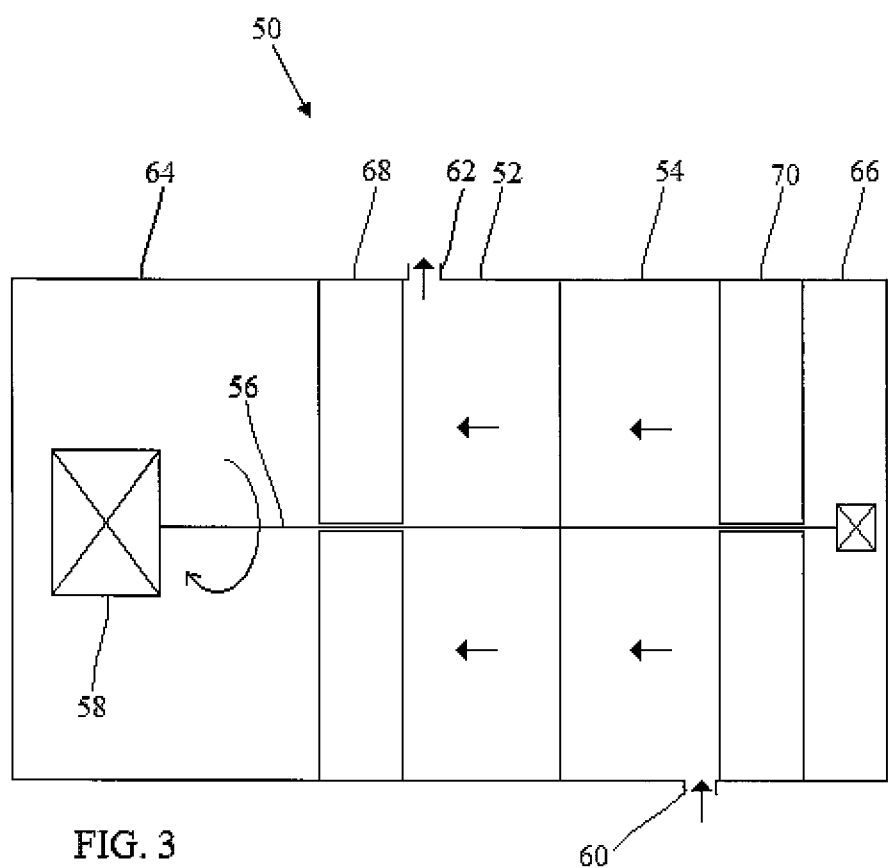

As shown by the horizontal arrows in FIG. 3, the pumping mechanism pumps gas in a generally horizontal direction. However, the net flow of gas from the inlet to the outlet is in a generally upwards direction even though along some of the gas flow path through the pump may be horizontal or even in a downwardly direction. It will be appreciated however that location of the inlet at the bottom of the pump resists the passage of contaminants into the pump from the vacuum line extending from a vacuum processing chamber.

The net flow of gas in the present system is in an upwardly direction through the vacuum pumping arrangement 12.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method of retro-fitting a vacuum pumping arrangement comprising a cartridge type vacuum pumping mechanism having an inlet which in use is higher than an outlet to the mechanism, the vacuum pumping arrangement being configured for rotating the cartridge type vacuum pumping mechanism in a first direction, the method comprising the steps of:
    removing the cartridge type vacuum pumping mechanism from the vacuum pumping arrangement,
    rotating the cartridge type vacuum pumping mechanism,
    replacing the cartridge type vacuum pumping mechanism in the vacuum pumping arrangement so that the inlet in use is lower than the outlet, and
    configuring the vacuum pumping arrangement so that the cartridge type vacuum pumping mechanism is in use rotated by a motor in a reverse direction.

2. A vacuum pumping arrangement wherein the vacuum pumping arrangement pumps gas from an inlet to an outlet thereof, the inlet being located at a bottom of the vacuum pumping arrangement which in use is lower than the outlet and gas flows through the inlet in an upwards direction wherein the net flow of gas pumped by the arrangement is in a generally upwards direction thereby resisting the passage of contaminants into the arrangement, and wherein the vacuum pumping arrangement further includes a cartridge type vacuum pumping mechanism inserted in the vacuum pumping arrangement in a first orientation relative to the vacuum pumping arrangement and which is configured to be removable from the vacuum pumping arrangement whereby it can be reinserted into the vacuum pumping arrangement in a second orientation relative to the vacuum pumping arrangement, the second orientation being 180° rotated with respect to the first orientation.

3. The vacuum pumping arrangement as claimed in claim 2, further comprising a vacuum line configured to connect an inlet of the vacuum pumping arrangement to a vacuum chamber and wherein a first section of the vacuum line connected to the inlet of the vacuum pumping arrangement extends in a generally upwardly direction beneath the arrangement to the inlet.

4. The vacuum pumping arrangement as claimed in claim 3, wherein the vacuum line further comprises:
    a second section for connection to the vacuum chamber which extends generally downwardly; and
    a third section which extends generally horizontal for trapping contaminants exhausted from a vacuum processing chamber.

5. The vacuum pumping arrangement as claimed in claim 3, wherein the vacuum line comprises a trap for trapping contaminants exhausted from the vacuum processing chamber, the trap being at a location which is lower than the inlet to the vacuum pumping arrangement.

6. The vacuum pumping arrangement as claimed in claim 2, wherein the outlet of the vacuum pumping arrangement is connected to two lines: a first line for connecting the outlet to an abatement apparatus and a second line for connection to a storage facility; wherein the system further comprises a valve which is operable for selectively directing gas exhausted from the vacuum pumping arrangement outlet to the abatement apparatus or the storage facility, the valve being located to receive heat from the vacuum pumping arrangement for reducing the condensation of substances in the valve.

7. The vacuum pumping arrangement as claimed in claim 6, wherein the valve is located at the outlet of the vacuum pumping arrangement.

8. The vacuum pumping arrangement as claimed in claim 6, wherein the valve is located on a housing of the vacuum pumping arrangement.

* * * * *